J. E. HANRAHAN.
TYPE CASTING ATTACHMENT FOR LINOTYPE MACHINES.
APPLICATION FILED NOV. 18, 1912. RENEWED FEB. 1, 1916.
1,196,107.
Patented Aug. 29, 1916.
9 SHEETS—SHEET 1.
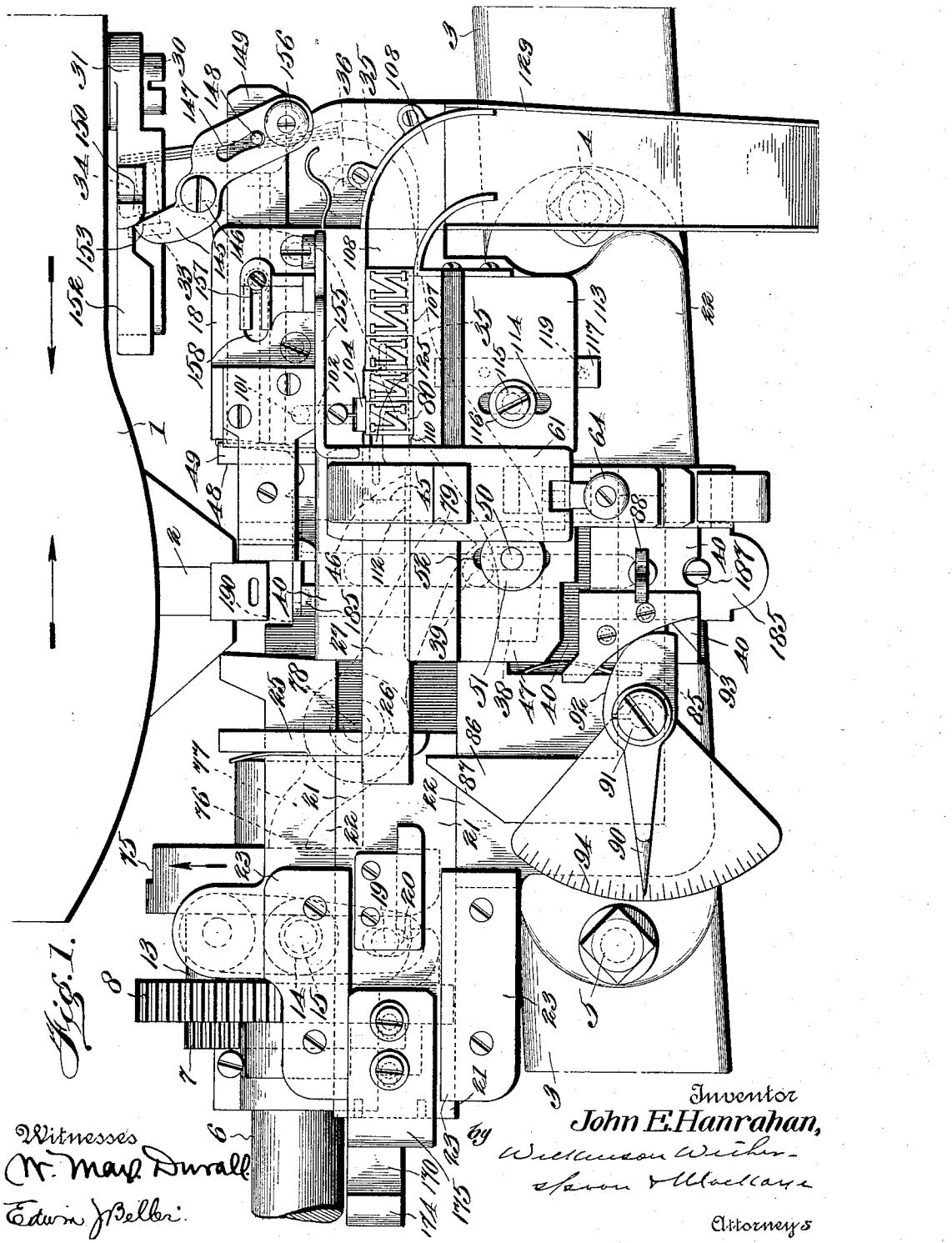

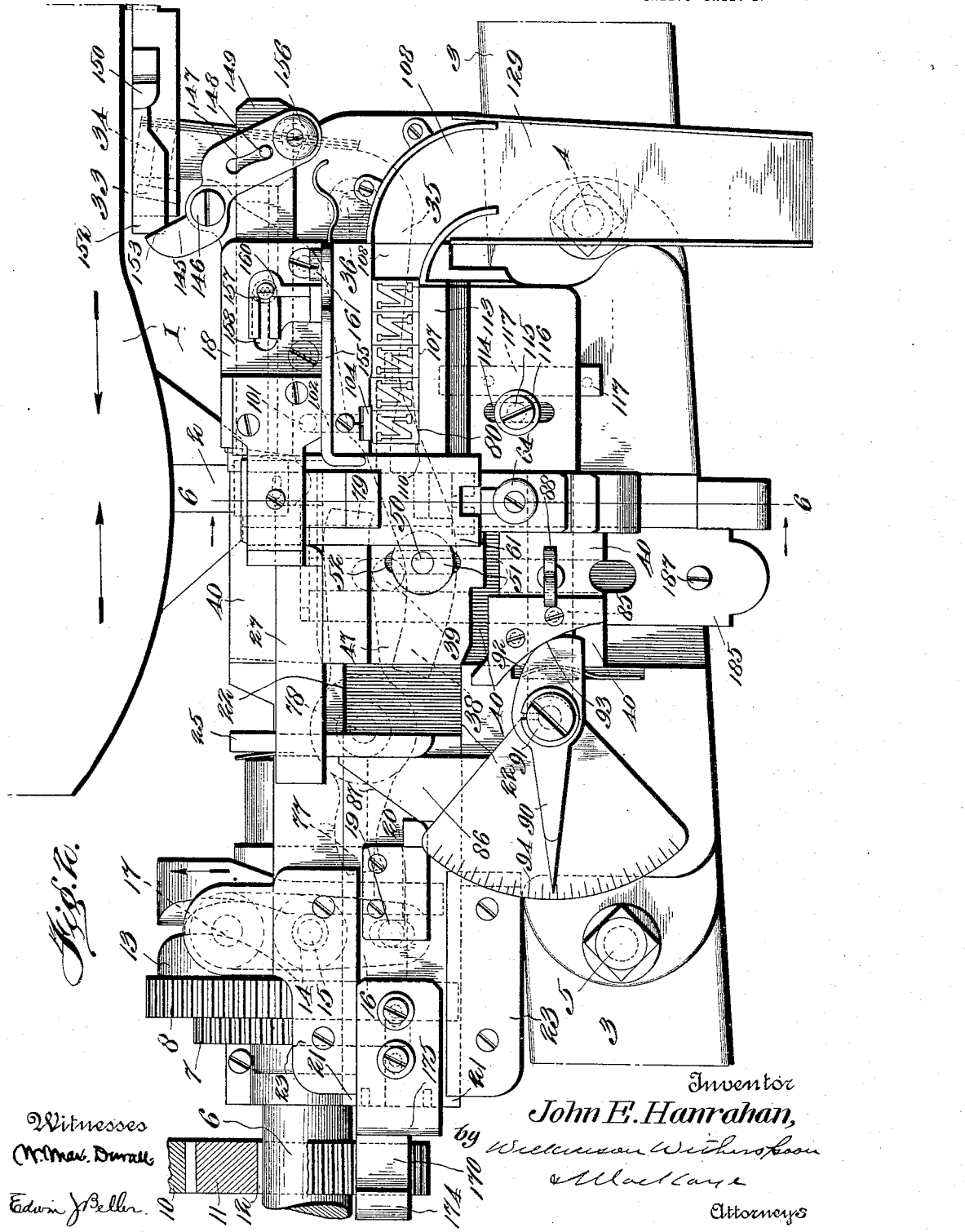

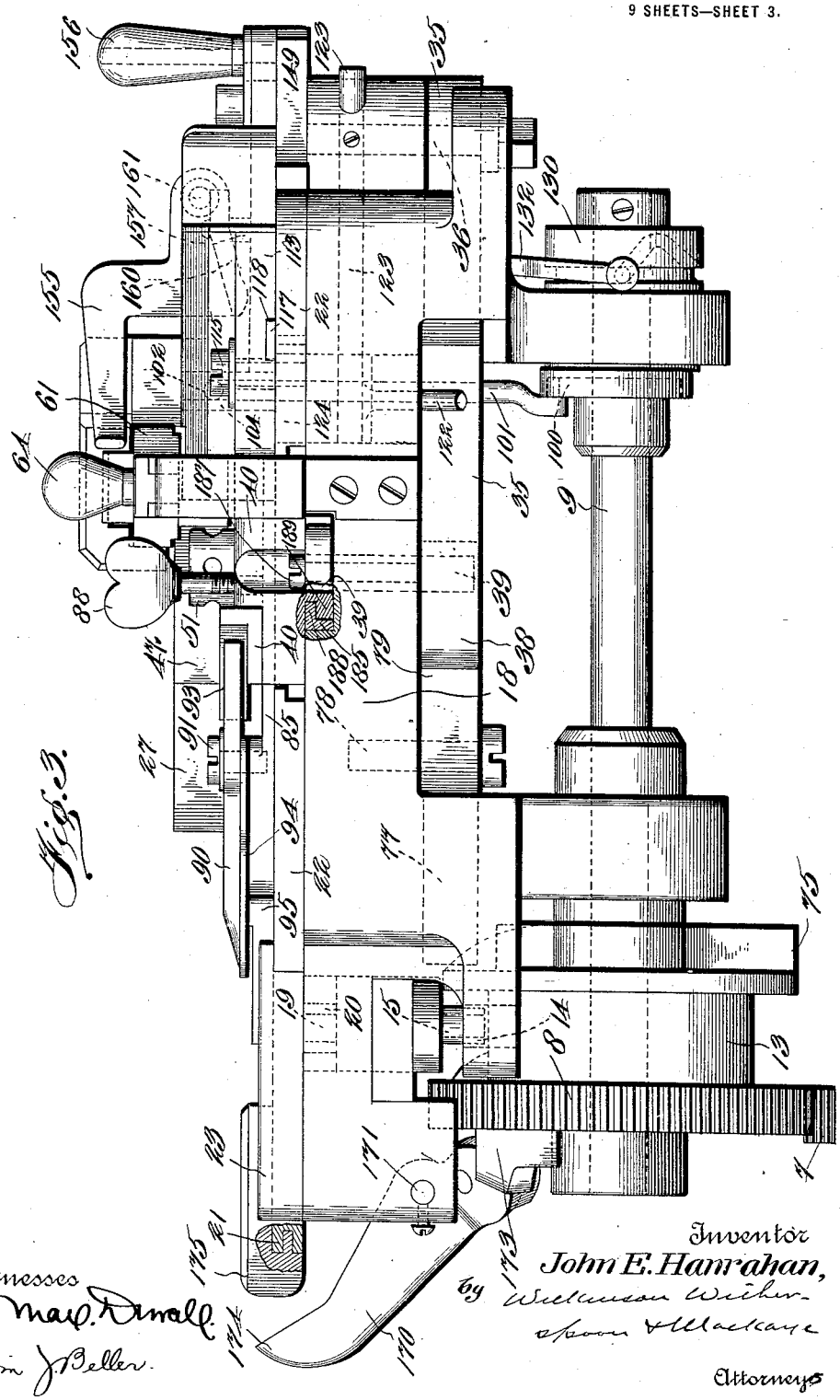

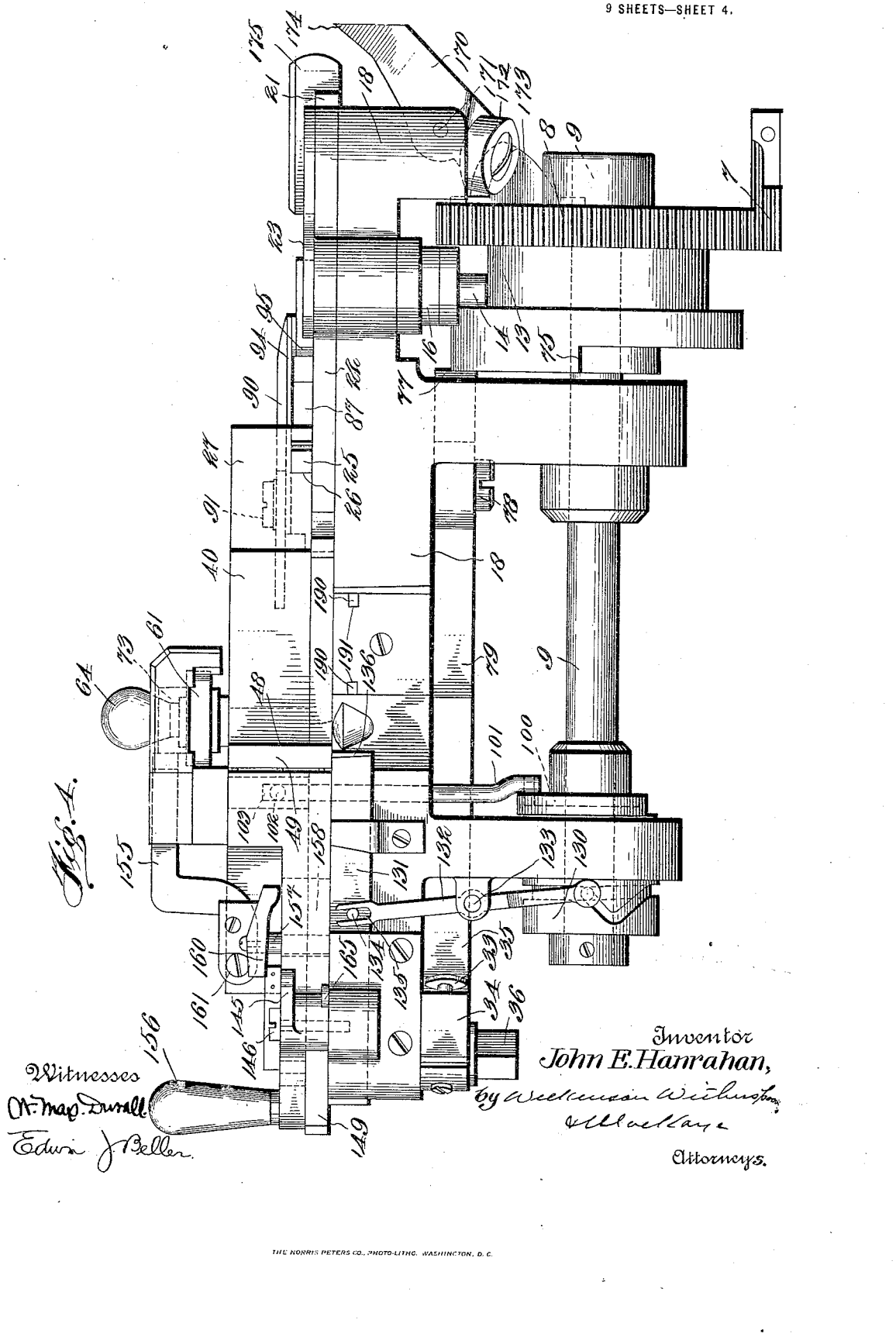

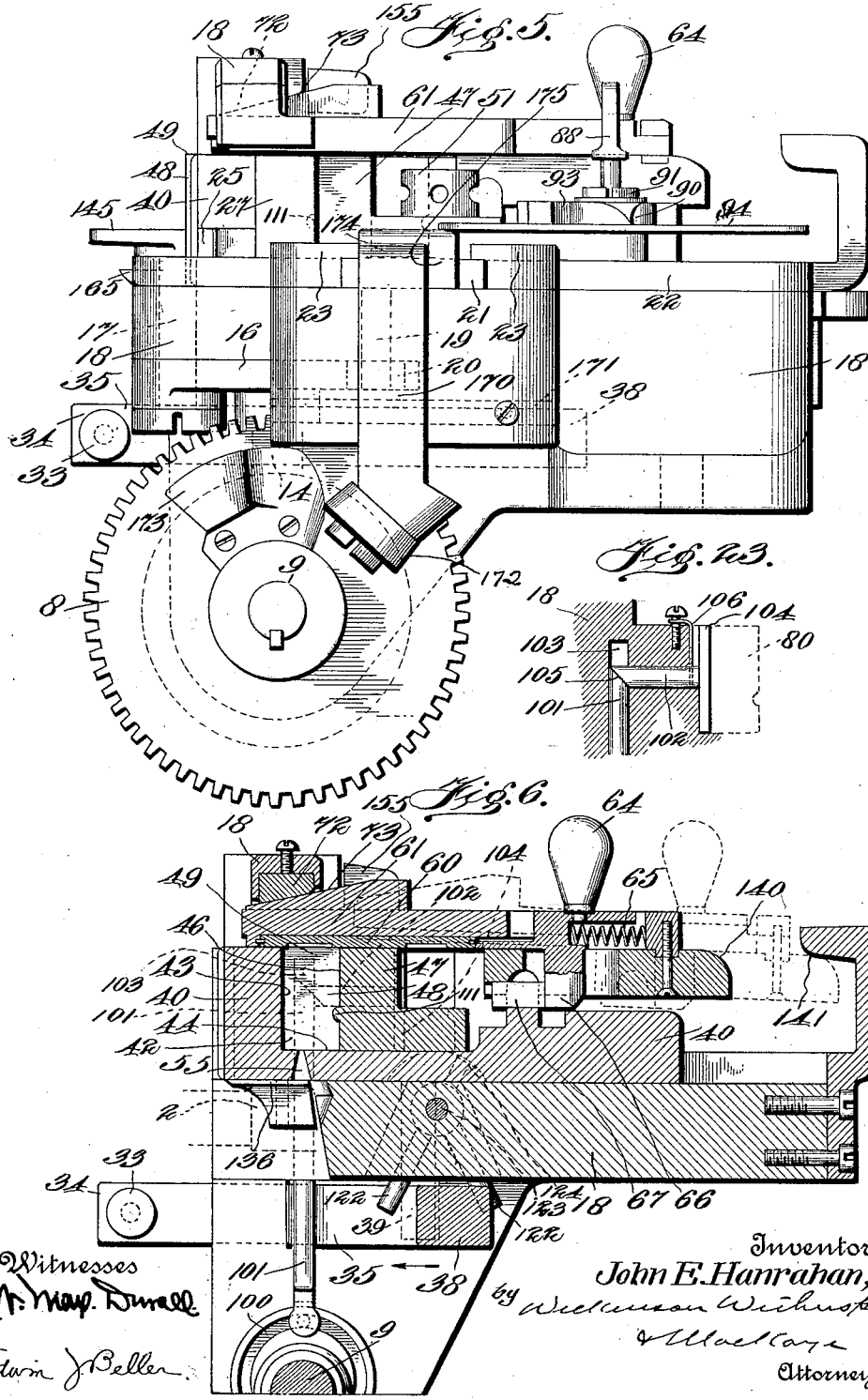

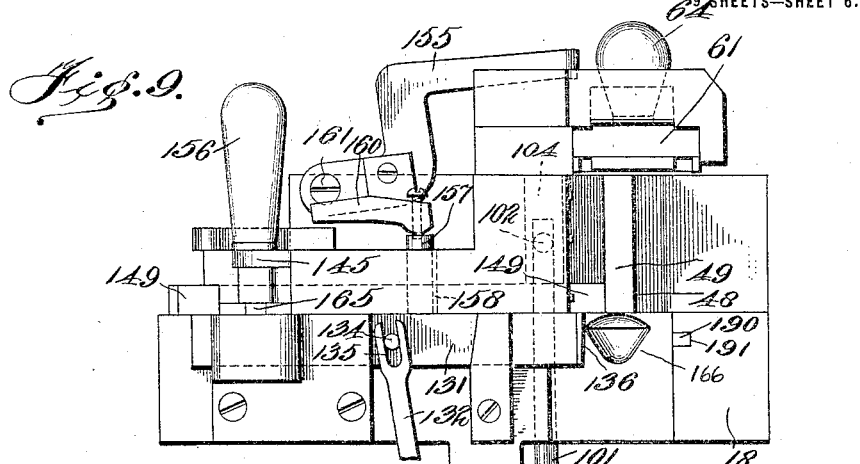
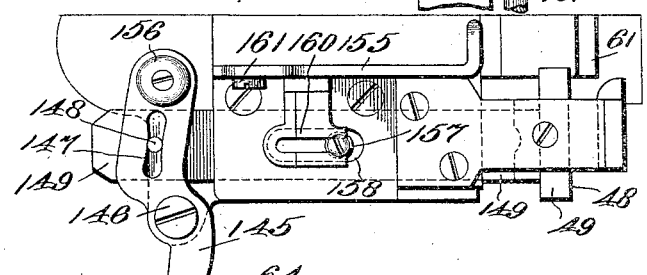
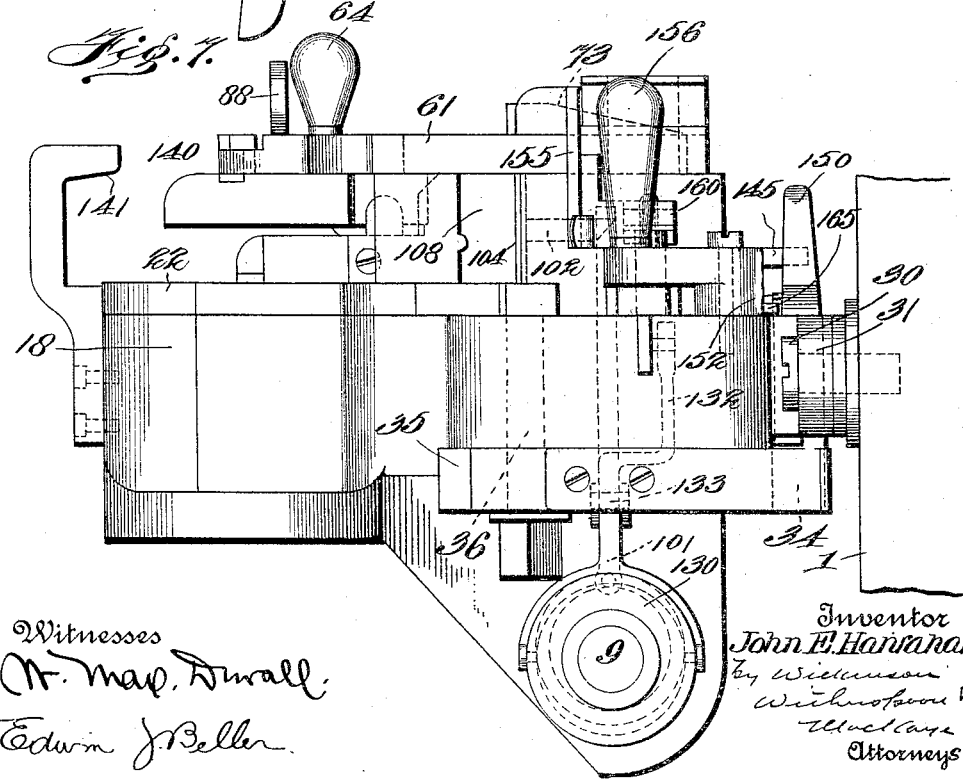

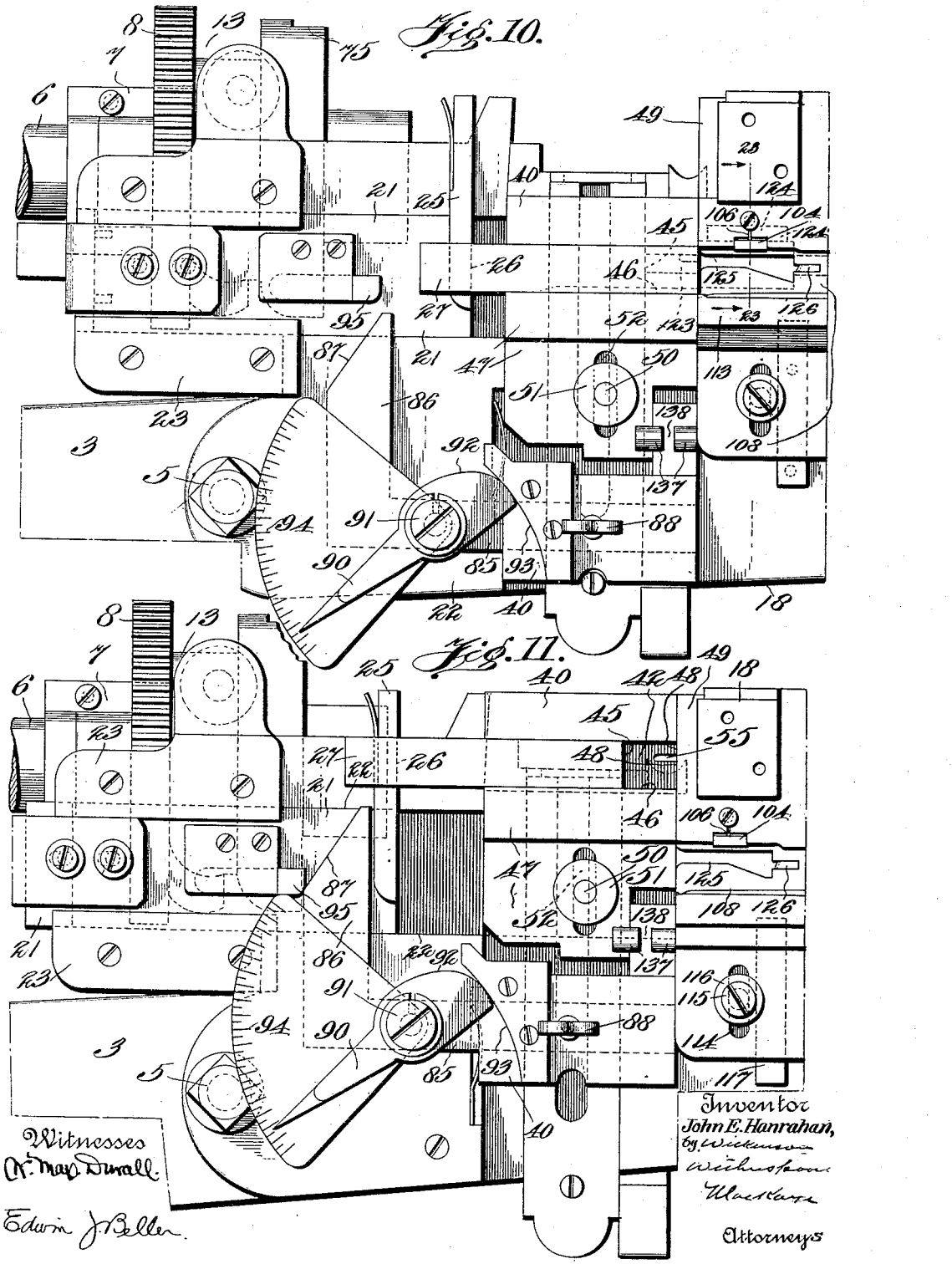

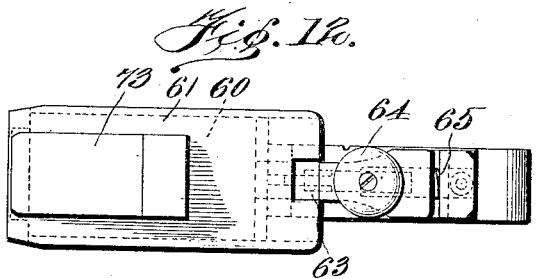
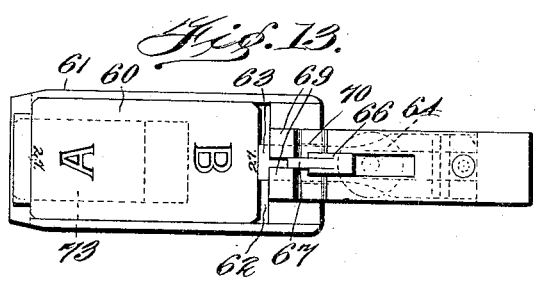
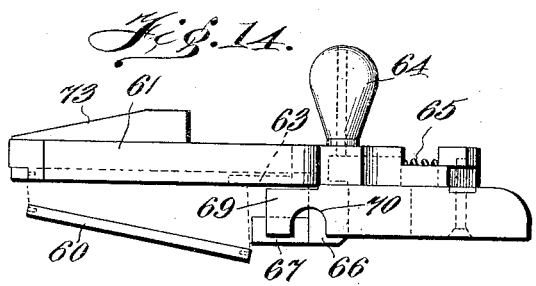
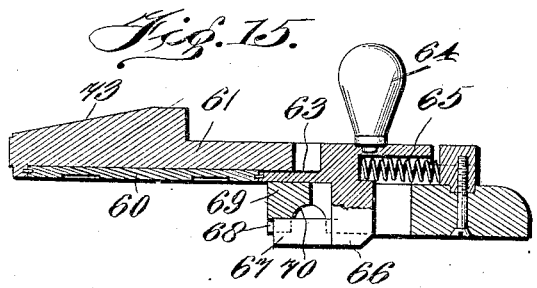
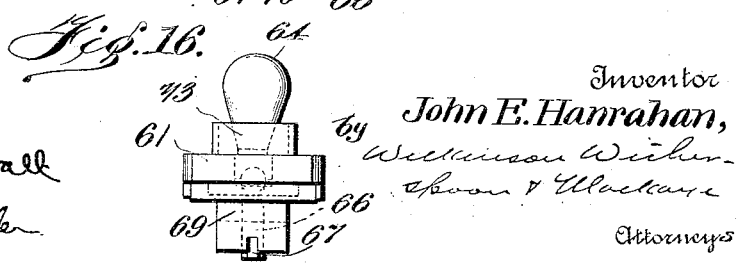

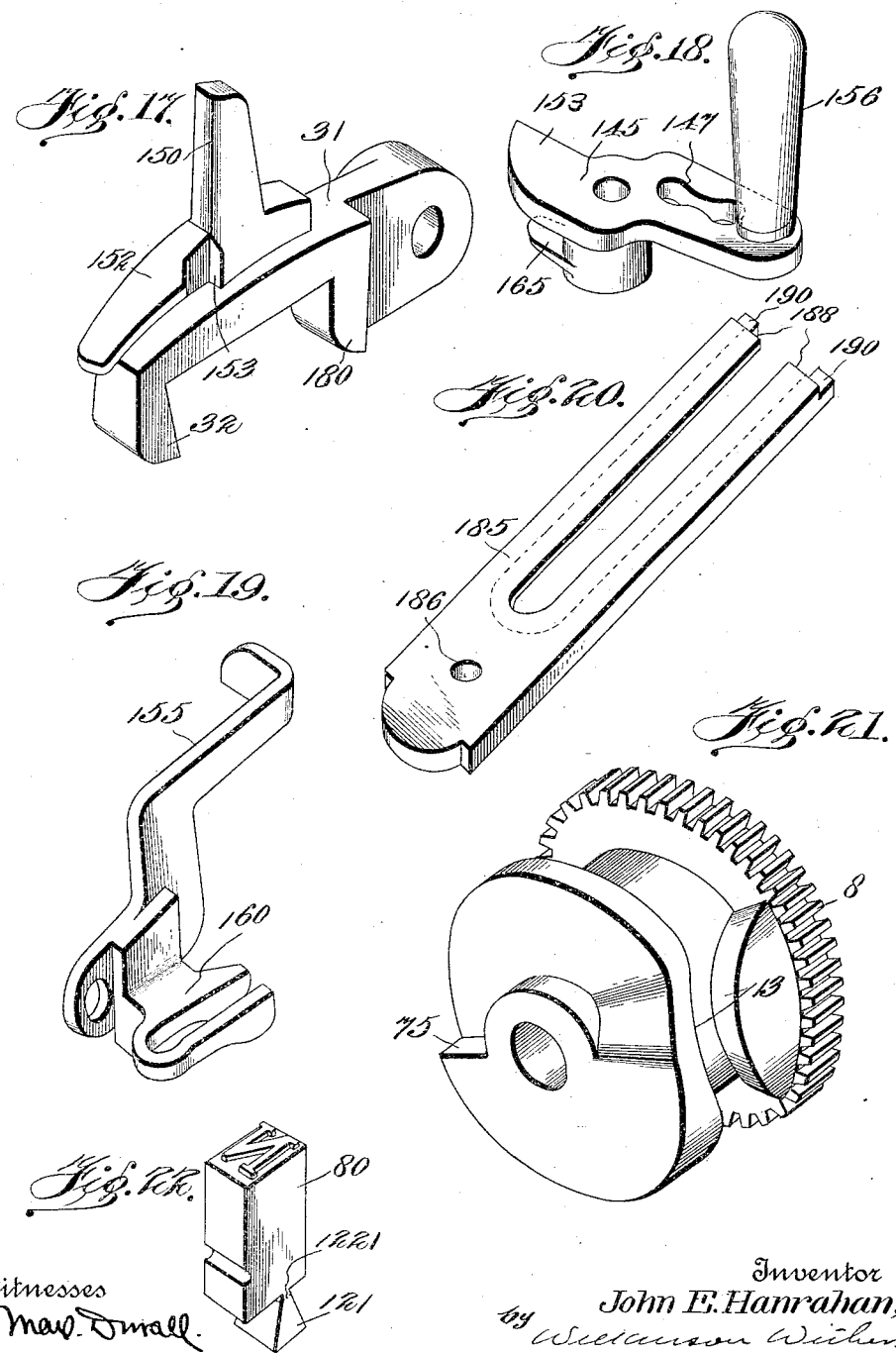

UNITED STATES PATENT OFFICE.

JOHN E. HANRAHAN, OF BALTIMORE, MARYLAND.

TYPE-CASTING ATTACHMENT FOR LINOTYPE-MACHINES.

1,196,107. Specification of Letters Patent. Patented Aug. 29, 1916.

Application filed November 18, 1912, Serial No. 732,104. Renewed February 1, 1916. Serial No. 75,628.

*To all whom it may concern:*

Be it known that I, JOHN E. HANRAHAN, a citizen of the United States, residing at Baltimore, in the State of Maryland, have invented certain new and useful Improvements in Type-Casting Attachments for Linotype-Machines; and I do hereby declare the following to be a full, clear, and exact description of the invention, such as will enable others skilled in the art to which it appertains to make and use the same.

This invention relates to attachments for linotype machines which will enable the operator to cast lines of type and single type of any desired size or dimensions simultaneously, and has for its object to produce an attachment of this character which will be simple in construction, certain in action, and also to improve upon the invention disclosed in my prior application #579,825, filed August 31, 1910, Patent No. 1,060,679 dated May 6, 1913.

To these ends the invention consists in the novel details of construction and combinations of parts more fully hereinafter disclosed and particularly pointed out in the claims.

Referring to the accompanying drawings forming a part of this specification in which like numerals designate like parts in all the views: Figure 1 is a top plan view of the attachment showing the parts in their non-casting position, or after the metal pot of the linotype machine has delivered its metal and moved to the rear; Fig. 2 is a similar view of the attachment showing the position of the parts in their casting position, or when the linotype machine has operated to move the metal pot forward to cast a line of type; Fig. 3 is a front elevational view showing the parts in the position illustrated in Fig. 1; Fig. 4 is a rear elevation also showing the parts in the position illustrated in Fig. 1; Fig. 5 is an end elevation of my improvement looking toward the right in Fig. 3; Fig. 6 is a vertical sectional view taken on the line 6—6 in Fig. 2, and looking in the direction of the arrow; Fig. 7 is an end elevation looking toward the left in Fig. 2; Fig. 8 is a detail view of the safety locking device for the single type matrix box; Fig. 9 is a rear elevational view of the same; Fig. 10 is a detail view showing the attachment set to cast a broader type than is intended by the other figures; Fig. 11 is a view similar to Fig. 10, but showing the position the parts assume while casting type; Figs. 12, 13, 14, 15 and 16 show detail views of the single type matrix box; Fig. 17 is a detail perspective view of the metal pot latch; Fig. 18 is a detail perspective view illustrating the pot latch operating lever; Fig. 19 is a detail perspective view of the safety locking device for the single type matrix box; Fig. 20 is a like detail view of the slide for retaining the single type carriage on the attachment bed; Fig. 21 is a similar detail view showing the driving gear, single type ejecting cam, and single type carriage retrieving cam; Fig. 22 is a perspective view of a cast type showing the same before it has been trimmed; and Fig. 23 (Sheet 5) is a detail sectional view taken on the line 23—23 of Fig. 10, looking in the direction of the arrows and shows part of the means for preventing the cast type from reëntering the mold cavity.

1 indicates the casting pot of the well known linotype machine, which has a motion toward the right and back, as indicated by the arrows in Fig. 1, and 2 represents a metal delivery spout which I have added to the pot 1, while 3 indicates a portion of the frame of the linotype machine upon which my attachment for casting single type may be secured, as by the bolts 4 and 5.

My attachment comprises a shaft 6 (Fig. 1) on which is mounted the gear 7 (Figs. 1, 2 and 3), which meshes with the gear 8 rigid with the cam 13 mounted on the shaft 9. The shaft 6 derives its power from the gear 10 (Fig. 2) forming a portion of the regular linotype machine, which meshes with the gear 11 also carried by the shaft 6, and keyed thereto as at 12. Associated with the groove of the cam 13 is a roller 14 mounted on the pin 15 (Figs. 1, 2, 3, 4 and 5). The said roller 14 and pin 15 are carried by a lever 16 pivoted as at 17 to the frame 18 of the attachment, see dotted lines Figs. 2 and 3, and full lines Fig. 5. The said lever 16 is provided with the slot 20 at its movable end which receives the pin 19, as best shown in Figs. 1, 2 and 5.

The upper end of the pin 19 is attached to the slide member 21 capable of being reciprocated in the ways of the plate 22, mounted upon the framework 18. The slide 21 is conveniently held in place by the members 23 secured to said framework on each side the said slide, as best indicated in Figs. 1, 2, 3, and 5, and rigidly attached to said slide 21 is the upright member 25, which fits a slot 26 in the sliding ejector member 27 (Fig. 10). It therefore compels the said ejecting member to reciprocate toward the right and left, as seen in said figure, and causes the same to eject the type already cast before the mold receives the metal for a new type, as will appear below.

Attached to the casting pot 1 of the linotype machine is a screw stud 30 which secures to said pot a latch like lever 31 (Fig. 17) provided with a downwardly extending lug 32 adapted to contact with the head of the bolt 33 (Fig. 1) carried by the end 34 of the lever 35 pivoted at 36 (Figs. 1, 2, 3, 4, 5, 6 and 7). The long end 38 of the lever 35 (Figs. 1 and 2) contacts with the pin 39 carried by the mold carriage 40 (Figs. 1, 2 and 6). As the said end 38 of the lever 35 turns on its pivot 36 in an upward and forward direction, as seen in Fig. 1, it will carry the pin 39 and the mold carriage 40 with it to the casting position illustrated in Figs. 2, 5, 6 and 11. During this motion, the ejector 27 will move with the mold carriage and slide along the member 25, as will be clear from Figs. 10 and 11.

The mold cavity 42 (Fig. 6) is composed of the faces 43 and 44 formed on the mold carriage 40 (Fig. 6), of the face 45 formed on the reciprocating type ejecting member 27 (Fig. 11), of the face 46 formed on the adjustable mold member 47 (Fig. 6), of the face 48 formed on a portion of the safety attachment 49 (Figs. 6 and 11), and of the member 60 described below. The adjustable member 47 constituting a portion of the mold carriage is secured, as best illustrated in Figs. 1, 2, 3, 5, 6, 10 and 11, to said carriage 40 by means of the pin 50 passing through the spanner nut 51 and through the slot 52 of the member 47 into the body of the said carriage, as will be readily understood from the above. The purpose of thus adjustably securing the member 47 to the member 40, is to provide for varying one of the dimensions of the individual type, as will appear more fully hereinafter.

It will be clear from what has now been said, the parts being properly timed, that as the metal casting pot 1 of the linotype machine reaches the position shown in Fig. 2, with the opening in its spout 2 in register with the mold gate 55, see Fig. 1, and dotted lines in Fig. 6, the mold cavity will be formed from the members above illustrated, and the pump of the metal pot will force metal through said opening in the spout 2, the gate 55 (best shown in Figs. 6 and 11) and into the mold cavity 42 against the matrix 60, thereupon casting a single type.

60 represents a matrix (Figs. 6 and 12 to 16) which is carried by the matrix box 61 comprising a recess 62 into which the matrix fits, and a slide member 63 which holds the said matrix in position, as best shown in Fig. 15.

The slide member 63 is provided with a handle 64 and is controlled by the spring 65. The slide member is further provided with an extension 66 provided with a reduced portion 67 adapted to fit into a slot 68, carried by a lug 69, rigid with the member 61. The said lug 69 is also provided with the cut-away portion 70, all for a purpose which will appear more fully hereinafter.

The matrix box moves back and forth with the mold carriage and is readily removable by hand from the said carriage, while the matrices 60 are readily removable from the matrix box, so that different matrices may be substituted at will, as will also be more fully disclosed below.

Rigid with the frame 18 of the attachment is a wedge member 72 against which the inclined surface 73 of the matrix box 61 contacts, when in its molding position, in order to make a tight joint between the face of the matrix and the mold cavity.

The foregoing operations are all accomplished during the first quarter rotation of the gear 8, and the parts are so proportioned that this said quarter turn takes place simultaneously with the first quarter turn of the linotype mold wheel (not shown).

As is well known, in the linotype machine, the mold wheel moves one-quarter of a turn and then stops, whereupon the line of type is cast and the casting pot 1 moves back from its mold cavity. The mold wheel of the linotype machine then begins another movement which continues through the second, third and fourth quarters of its revolution. Simultaneously with this third quarter turn of the mold wheel, the cam 13 also moves through a three-quarter revolution. The said cam 13, as best shown in Fig. 21, is provided with the shoulder 75, which, during this three-quarter turn, is adapted to strike the end 76 of the lever 77, pivoted at 78 to the frame 18 of the machine, as best shown in dotted lines in Figs. 1 and 2. The other end 79 of the lever 77 contacts with the pin 39 on the mold carriage 40, and as said lever 77 is turned upon its pivot 78, its end 79 therefore returns the said mold carriage, matrix box, ejector and associated parts from the position shown in Fig. 2 to the position shown in Fig. 1.

When the mold carriage 40 is moved from its noncasting position shown in Fig. 1, by means of the lever 35, to its casting position shown in Fig. 2, it is liable to be tipped and to thus bring the matrix box 61 out of alinement with the inclined surface of the member 72 (Fig. 6), and thereupon disarrange the parts. In order to avoid this, I have provided a slideway 185 (Fig. 20), provided with a hole 186 through which passes a screw 187 (Fig. 2) into the framework. This slideway is provided with the under-cut portions 188 (Fig. 3), under which fit corresponding portions 189 on the mold carriage, so that the latter can not tilt at all during this reciprocation. In order to firmly hold the slide member 185 firmly in position, it is not only provided with the screw 187, but also with the forwardly projecting lugs 190, which fit into corresponding recesses 191 in the frame 18 (Fig. 4). The ejection of the type now cast will be effected upon the next first quarter turn of the gear wheel 8, which is also simultaneous with the next first quarter turn of the linotype mold wheel. That is to say, the reciprocating of the ejector 27 by means of the member 25, causes the type 80 to be forced out of the mold cavity and into the channelway 108 shown in Fig. 1. The continued revolution of the cam 13 during the first quarter turn causes the said ejector not only to eject the type, but it also retracts said ejector out of the mold cavity and brings it back into the position shown in Fig. 1.

Mounted on the mold carriage 40 is a sliding member 85 having an L-shaped projection 86 provided with the inclined surface 87 (Figs. 1, 2, 10 and 11). The said slide member 85 is controlled by the wing nut 88 passing down through to the carriage 40, as best illustrated in Fig. 3, and holds the member 85 in its adjusted position. Located on the member 85 is the pointer 90 pivoted at 91 and provided with a cam surface 92 adapted to contact with the cam surface 93 located on said carriage 40. A scale 94 is provided over which the pointer 90 travels. Mounted on the slide 21 is the lug 95, with which the surface 87 contacts, when the parts are in their casting position. It therefore, follows that the movement of the slide member 21 and the ejecting member 27 will be controlled by the position of the pointer 90, owing to the fact that the said ejector 27 can only move inward until it contacts with said inclined surface 87. It therefore follows from this, that the face 45 of the mold cavity 42 will be likewise controlled in its travel by the said inclined surface 87, and further, that the width of the type will be also controlled by the movements of the pointer 90. The dimensions of the type in a direction at right angles to these movements will be controlled by the position of the pin 50 in the slot 52, which position governs the location of the face 46 on the adjustable member 47, as above mentioned. When the said surface 46 has been adjusted, as just described, it is evident that the width of the strip 27 will not be sufficient to span the mold cavity, and therefore, I remove the strip 27 from the member 26 and substitute therefor a new strip of the proper width to form a side of the mold cavity. The surface 46, however, is provided with the inwardly projecting portion 111, as best shown in Fig. 6, which fits into the edge of the strip 27, as indicated by the dotted line 112 in Fig. 1, and therefore, before the said strip 27 can be removed, it is necessary to retract the adjustable member 47 by loosening the washer or nut 51, and sliding the said member 47 to the right, as seen in Fig. 6. After the new strip 27 has been placed in position, then the member 47 is moved toward the left, as seen in Fig. 6, and the nut 51 tightened sufficiently to hold it.

The removal of the matrix box, in the manner to be described, facilitates the above operation. Mounted upon the plate 22 (see especially Figs. 1 and 3) is an adjustable plate-like member 113 provided with a slot 114 which forms one wall of the channel 108 for the accommodation of the type 80. It follows that when the dimensions of the mold cavity are changed, as indicated above, it is necessary to correspondingly change the width of the channel 108 by adjusting the said plate 113 relatively to the pin or screw 115 passing down through the slot 114. When the plate 113 is properly adjusted, the said screw 115 is set up and by means of its nut or washer 116, the said plate 113 is firmly held in its new position.

In order to insure the correct alinement of the type in the channel 108 and to maintain the plate 113 accurately in the proper position, I have provided a strip 117 which fits in a recess 118 in the plate 113, and which guides the same in its movements. The said strip 117 is secured to the plate 22 as by means of the pins 119, all of which will be clear from Figs. 1 and 3.

In order to prevent the type from sticking, after they have been cast, the following mechanism is provided: Mounted on the shaft 9 is a cam member 100 into which fits the end of a bent rod 101 which reciprocates through a channel 103 in the frame 18 (Figs. 4 and 23). The upper end of this rod is beveled as at 105, and fits against a correspondingly beveled end of a short stud 102 controlled by a spring 106, carrying at its other end a plate 104, which fits against one face of the type, as best illustrated in Figs. 1 and 23. The upward movement of the rod 101 forces the stud 102 outwardly against the tension of the spring 106, and thereby causes the plate 104 to jam the type against the surface 107 of the channel-way 108 and behind a slight shoulder 110 on the plate 113, and thereby prevents the said type from reëntering the mold cavity. The type is finally delivered through the end of the channel-way 108, and chute 129, into any suitable receptacle, not shown.

After the cast is made, it of course is essential that the type be trimmed and in order to accomplish this, I have provided the following mechanism: As best seen in Fig. 22, and as is well known, when the type are cast, there is a lug 121 left on the bottom which is usually broken off as along the line 1221, leaving a slight projection on the bottom of the type which later has to be trimmed off in order to make the base of the type perfectly smooth.

The mechanism now referred to first breaks off the lug 121 and then additional mechanism cuts off the rough portion remaining at 1221, as will now be described. As best shown in Figs. 3 and 6, in the path of the lever 35 there is located a double pronged lever 122 which straddles the lever 35 and is operated thereby. Said lever is pivoted as at 123 and provided on its upper end with a knife like member 124, which is adapted to be moved in the arc of a circle as the said prongs 122 are moved.

Referring especially to Fig. 6, it will be clear that when the mold carriage 40 first moves forward into the casting position shown in said figure, the knife 124 is moved into its dotted line position there shown, by the lever 35 striking one of the prongs 122 and moving in the direction indicated by the arrow in said figure. Later, after the cast has been made, the carriage is moved back by the lever 79 coming in contact with the pin 39 (Fig. 2). But, the said pin 39 now contacts with the end 38 of the lever 35 (Figs. 1 and 2), and causes the said lever 35 to strike the other prong 122 and to force the knife 124 from its dotted line position shown in Fig. 6, to a new position, not shown, but over toward the left of said dotted position, as seen in said figure. The knife 124 being in the last position just stated is to one side of the lugs 121 as they rest in the channel 108 (Figs. 1 and 2); so upon the next movement of the lever 35 to bring the carriage 40 back to its casting position, the said knife 124 is thrown over again to the position shown in Fig. 6, and in reaching this position, it snaps off a lug 121 on the type 80 which lies in its path.

As best shown in Figs. 1 and 10, a passage 125 is provided in the frame 18 through which the lug 121 on the type 80 is forced just before the knife 124 cuts off said lug in order to facilitate the removal of said lug. But, as above stated, the breaking or cutting off of the lug 121 leaves a rough portion 1221 on the bottom of the type, and this said portion 1221 is now removed by the type being forced along the passage 125 until the said rough portion 122 comes in contact with the fixed knife 126 at the extreme right hand end, as seen in Fig. 10, of the passage 125. In other words, the type are firmly held in the channel 108 and the knife 126 being located in the bottom of said channel, at the end of the passage 125, the said knife cuts off the portion 1221 while the type are being forced along the said channel. This movement of the type is effected by means of the ejector 27 forcing the outermost type forward through the agency of the recently cast type. A chute 129 is conveniently provided into which the channel 108 delivers.

In addition to the above trimming mechanism, I provide a means for clearing away any metal which may collect around the base of the casting orifice 55 as will now be described. That is to say, referring first to Fig. 4, there is provided upon the shaft 9 an additional cam 130 which, during the first quarter turn of the gear wheel 8, reciprocates the member 131 by means of the slotted lever 132, pivoted as at 133. The said member 131 is provided with a pin 134, which works in a slot 135 on the said lever 132, and the extreme end 136 of the said member 131 reciprocates past the gate 55, as will be clear from Figs. 4, 6 and 7. The movement of the end 136 of the said lever 135 across the said gate clears away any filaments of metal which are liable to be left upon the bottom of the mold carriage 40, and therefore, insures a clean and perfect cast for the succeeding type.

Referring now again to the matrix box 61, the semi-circular slot 70 pivots upon a bifurcated lug 137 provided with the slot 138 best shown in Figs. 10 and 11. The member 67 of the lug 66 fits the said slot 138 for a purpose to be described below.

When the mold carriage 40 moves from its casting position shown in Fig. 2, back to its non-casting position shown in Fig. 1, the curved rear end 140 of the matrix box strikes the curved portion 141 of the frame 18 (Fig. 6), and thereupon the matrix box is tilted on the said lug 137 as a pivot from its full line position shown in Fig. 6 to its dotted line position shown in said figure. The tilting of the matrix box thus accomplished, automatically separates the matrix from the cast type, and enables the same to be ejected from the mold cavity by the member 27.

When the carriage 40 is in the position shown in Fig. 1, a safety latch to be described, may be unlocked and the matrix box may be taken off the carriage 40 by hand, whereupon the handle 64 may be retracted against the force of the spring 65 to disengage the member 63 from the matrix whereupon a new matrix may be inserted and the matrix box restored to its normal position. Should it now be attempted to restore the matrix box to its normal position upon the mold carriage 40 before a matrix 60 has been inserted in place, the spring 65 will force the member 63 as well as the members 66 and 67 forward into the full line position shown in Fig. 14, whereupon the portion 67 will strike against the bifurcated lug 137 and prevent the said box from being properly positioned. In other words, it is not possible to replace the matrix box and obtain a cast unless a matrix is in position, and this is an important feature of my invention, as will now appear. In attachments of this kind, it will be recognized that the casting pot 1 is being constantly reciprocated backward and forward in order to cast regular lines of type and the pump of the said pot, not shown, is constantly squirting metal not only through the regular orifice, not shown, for casting lines of type, but also through the orifice 2, which I have provided. Now, if for any reason, the mold carriage 40 should be brought to its casting position, and should the mold cavity 42 not be metal tight, as for example, by there not being any matrix box in place, or any matrix in position when the box is in place, and then metal would not only be squirted through the metal cavity and over all of its moving parts, thus freezing them up, but it also might possibly be squirted over the operator's face, or over other parts of his body, thereby causing a very serious accident. In order to provide against such an accident, I have provided the above means for preventing the matrix box being replaced when it does not contain a matrix, and I have also provided the following mechanism, which will disengage the connection between the mold carriage and the pot, should the matrix box not have been replaced. This insures, in that event, the mold not being moved forward to its casting position. At the same time, the mechanism brings a cover over the casting orifice 55, in order to prevent any metal which may come from the casting pot 1 from entering the mold cavity. In other words, the mechanism now to be described, effectually prevents metal from entering the moving parts of the attachment and thus freezing up the machine, as well as effectually prevents possible injury to the operator.

In order to accomplish the foregoing results, I have provided the lever 145 (Fig. 1) pivoted as at 146 to the framework and provided with the slot 147, into which extends the pin 148 carried by the sliding member 149.

Referring now again to Fig. 17, the latch like lever 31 is provided with an upwardly extending trigger like member 150 and a curved L-shaped extension thereof 152, as well as with a cut-away shoulder 153 at the point of junction between the members 150 and 152.

The extreme end 154 of the lever 145 (Figs. 1, 17 and 18) normally contacts with the member 150 only when the metal pot 1 is in its extreme rearward position, as indicated in Fig. 1. On the other hand, before the matrix box 61 can be removed from the mold carriage 40, the safety lever 155 must be lifted as best illustrated in Fig. 9.

The lifting of the lever 155 is accomplished as follows: The handle 156 carried by the lever 145, is moved toward the left, as seen in Fig. 1, which, through the slot 147 and pin 148 moves the slide bar 149 also toward the left, as seen in said figure, and this said movement of the slide bar carries its L-shaped extension 49 over the casting orifice as above mentioned. The slide bar 149 is also provided with a pin 157 moving in the slot 158, with which the frame 18 is provided; the said pin 157 coöperates with the crank portion 160 of the lever 155, which is pivoted at 161, in order to lift said lever 155 into the position shown in Fig. 9. The portion 160 of the said lever is curved on its under face, as shown, in order to facilitate the lifting action of the pin 157. It being necessary to lift the lever 155 when the matrix box is removed, it remains lifted while said box is not in position, and the end 153 of said lever 145 is accordingly moved over from the position shown in Fig. 1 to a position farther toward the right in said figure. Therefore, said end 153 will contact with the part 150 of the latch-like member 31 earlier in the movement of the pot 1 than would otherwise be the case. When in this safety position, should this earlier contact take place, the latch member 31 will be swung on its pivot, and the curved lug 165 carried by the lever 145, will slide down past the shoulder 153 on the said latch member 31 and engage under the curved lug member 152, carried by said latch 31, thus locking the latch 31 and lever 145 together, all as will be clear from Figs. 1, 17 and 18. Further, the earlier engagement between the end 153 of the lever 145 and the trigger member 150, raises the lug member 32 of the latch 31 out of engagement with the end 34 of the operating lever 35, and thereby prevents the mold carriage from being forwarded into its casting position, as above stated.

It will thus be seen owing to the fact that the lever 155 must be raised in order to remove the matrix box from the mold carriage, that the operating lever 35 will be disengaged from the metal pot 1, and the said mold carriage will not be forwarded to its casting position should the operator forget to replace the matrix box. It will also be seen that the casting orifice will be governed in such event, and that although the metal pot may squirt metal out of the orifice 2, yet it will strike the underface of the member 49, and be received in the space 166 of the frame 18, and therefore accomplish no damage.

It sometimes happens in an attachment of this kind, that the ejecting slide becomes stuck and refuses to operate. In order to restore the same to its normal condition, I have provided the pivoted hammer lever 170 pivoted to the main frame at 171 and having the roller 172 on its lower end adapted to be struck by the swell 173 on the gear 8, all as will be clear from Figs. 3, 4 and 5. The extreme upper end 174 of the lever 170 lies in the path of the head 175 attached to the slide 21, and as the gear 8 revolves, the said end 174 delivers a blow to said head 175 should it not have already moved toward the right, as seen in Fig. 3.

The operation of my invention will be clear from the foregoing, but may be briefly summarized as follows: The attachment being secured to the framework 3 of the regular linotype machine, and power being supplied from said machine through the gears 10 and 11, simultaneously with the first quarter turn of the linotype mold wheel, not shown, the gear 8 and cam 13 will likewise make a quarter turn. The beginning of this quarter turn of the gear 8 and cam 13 finds the parts in the position shown in Fig. 1, reciprocates the ejector 27 to eject the type already cast from the mold cavity 42, and forces the said type into the channel-way 108. While the said type is being thus forced into said channel-way, the lug 121 which has been cast on the said type, is forced through the restricted passage 125 and the knife 124 is set into position ready to snap off said lug when the mold carriage and parts return again to their positions shown in said Fig. 1. Further, the forcing of the type body 80 over the restricted passage 125 and along the channel-way 108 brings the rough end of the broken portion of the lug still sticking to the type, against the fixed knife 126 (Fig. 10), and thereupon trims the bottom of the type smooth.

The type 80 previously cast and forced into the channel-way 108 next comes under the influence of the spring controlled plate 104 which jams the same against the surface 107 of said channel-way and behind the lug 110, which prevents the said type 80 from reëntering the mold cavity. This plate 104 is actuated by means of the cam 100 on the shaft 9 and through the rod 101. Also, during this first quarter turn of the gear 8 and cam 13, the cam 130 on the shaft 9, by means of the lever 132, reciprocates the trimming member 136, which serves to scrape off any metal which may be adhering to the under-side of the mold carriage 40 (Figs. 4 and 6), and thereby to clean this surface and insure a perfect cast for the succeeding type.

As is well known, in the linotype machine, after the mold wheel has made its first quarter turn, the casting pot 1 then moves to the right, as shown in Fig. 1, in order to deliver metal to cast the lines of type. During this motion of the casting pot, the latch lever 31 by means of the lug 32, turns the carriage lever 35 upon its pivot 36 and by means of the end 38 of said lever, contacting with the pin 39, upon the mold carriage, the parts are brought from their non-casting position shown in Fig. 1 to their casting position shown in Fig. 2. Simultaneously with the squirting of the metal to cast the lines of type, metal is also forced through the orifice 2 into the mold cavity and the single type 80 is now cast. The pot 1 next moves to the left, as seen in Fig. 2, the beveled toe 180 of the latch lever 31 now rides over the end 34 of the lever 35, and therefore, does not actuate the said lever. In the meantime, the sprue or metal connecting the type 80 with the said orifice 2 is soft, and the rearward motion of the pot 1 readily separates the said spout 2 from the lug 121 of the newly cast type 80. While the pot is thus returning to its rearward position, just described, the metal cavity 42 and the metal therein, remain stationary in the position shown in Fig. 2, so that the said metal has time to cool and solidify before it is brought to the ejecting and non-casting position shown in Fig. 1. The pot 1 having now returned to its rearward position, the mold wheel of the linotype machine, as is well known, next makes a three-quarter turn of its revolution. Simultaneously with this three-quarter turn, the gear 8 and cam 13 also makes a three-quarter turn of their revolutions. This latter movement of the cam 13, through the shoulder 75 carried by said cam, actuates the operating lever 77 (Figs. 1 and 2), which, through its ends 79 and the pin 39, moves the mold carriage from its casting position shown in Fig. 2, to its non-casting position shown in Fig. 1. The movement of the pin 39 and mold carriage further restores the lever 35 from its dotted line position shown in Fig. 2, to its dotted line position shown in Fig. 1 ready to be again actuated by the lug 32 when the pot 1 again moves forward. Upon this rearward movement of the mold carriage the matrix box strikes the beveled surface 141 of the framework, and automatically lifts the matrix from the mold cavity, and thus frees the cast type from said matrix, thus leaving it in condition to be readily ejected from the mold cavity by means of the ejector 27, which ejection takes place upon the next quarter turn of the cam 13, as above described.

During the reciprocations of the mold carriage back and forth, the mold carriage is prevented from tilting by reason of its slide members 189 taking under the overhanging slide members 188 of the slide 185 (Figs. 3 and 20).

The dimensions of the mold cavity, and therefore of the type, are readily changed by reason of the fact that the surface 46 of the said cavity is adjustable by moving the member 47 backward and forward relatively to the pin 50, and the surface 45 of said cavity, which is located in a plane at right angles to the plane of the surface 46, is likewise adjustable by reason of the adjustable stop formed by the inclined surface 85 on the L-shaped extension 86 of the sliding member 85. The said inclined surface 87 is adjustable through the movement of the lever 90 over the scale 94, and the mold surface 45 is readily changed in width because the ejector member 27 carrying said surface is readily interchangeable with like ejector members having mold surfaces 45 of different dimensions, which may be readily placed upon the reciprocating member 25.

The matrices may also be readily changed in this invention, the matrix carriage 61 being readily removable by hand from the mold carriage when new matrices may be as readily inserted.

The matrix box is removed from the mold carriage by moving the mold carriage to the rear, as shown in dotted lines in Fig. 6, and then raising the safety lever 155 in the manner to be referred to below. The matrix box being removed from the mold carriage, the handle 64 is retracted against the power of the spring 65, and the matrix 60 readily removed and a new one inserted. Should a new matrix not be inserted, the spring 65 will force the handle 64 and its associated members 66 and 67 to the left, as seen in Fig. 6, and into the position shown in Fig. 14, which position prevents the said members from fitting upon their supports, and therefore, prevents the said matrix box from being replaced upon the mold carriage, and for a purpose to be referred to below.

It follows from the foregoing that any desired style of single type of different dimensions may be cast by means of this improvement, simultaneously with the casting of lines of type.

In order to prevent hot metal from being squirted over the moving parts of the machine, and thereby freezing them up, or over the face or body of the operator, and thereby causing a serious accident, it is necessary that the mold cavity be metal tight whenever metal is squirted therein, and it is also necessary that the pot 1 should not be capable of squirting metal into the mold cavity unless the matrix box is in place. In order to accomplish these results, the mold cavity is maintained metal tight when the matrix box is in place, by reason of the fact that said cavity cannot be in its casting position unless all of its parts, except the matrix, are in the proper position; and it is necessary that the matrix be in its proper position in the matrix box by reason of the fact that the matrix box cannot be placed on the mold carriage unless the matrix is in place, as has been just stated. It remains to prevent metal from being squirted into the mold cavity when the matrix box is entirely omitted. This is accomplished in that case by not bringing the mold cavity to its casting position; the lever 145, and the slide 149, and their associated parts, being brought into action. That is to say, the matrix box cannot be removed from the mold carriage without raising the safety lever 155; and the said safety lever cannot be raised without turning the lever 145 upon its pivot, and thereby causing it to engage the trigger member 150 earlier in its reciprocations than would otherwise be the case. But, when the said lever 145 is thus engaged at an earlier period, it causes the operating lever 35 to be disengaged from the mold carriage, and therefore, it prevents the mold carriage from being moved forward to its casting position. At the same time, the lifting of the safety lever 155 through the means just described, and its associated parts, causes the member 49 to cover the gate 55 of the cavity 42, and to effectually prevent any metal from entering said cavity, even though the parts are not moved forward. It, therefore, follows that should any accidental squirting of metal take place, it will strike against the bottom of the member 49, and will do no harm.

It is obvious that those skilled in the art may vary the details of construction and the arrangement of parts, without departing from the spirit of my invention, and therefore I do not wish to be limited to the above disclosures except as may be required by the claims.

What I claim is:—

1. In a single type casting attachment, a movable mold carriage; means adapted to be operated from parts of a lintoype machine for moving said carriage into and out of casting position; and means forming a part of the mold cavity for automatically ejecting the cast type when said carriage is in its non-casting position, substantially as described.

2. In a single type casting attachment for a linotype machine the combination of a movable mold carriage; means adapted to be operated from one part of said machine for moving said carriage into its casting position; means adapted to be operated from another part of said machine for moving said carriage from its casting to its non-casting position; and sliding means operated from said second part of said machine for ejecting the cast type, substantially as described.

3. In a single type casting attachment for a linotype machine the combination of a movable mold carriage; means comprising a pivoted lever adapted to be operated from one part of said machine for moving said carriage into its casting position; means comprising a second lever adapted to be operated from another part of said machine for moving said carriage from its casting to its non-casting position; and sliding means comprising a readily detachable member operated from said second part of said machine for ejecting the cast type, substantially as described.

4. In a single type casting attachment for a linotype machine the combination of a movable mold carriage provided with a mold cavity; a pivoted lever adapted to be operated from the casting pot of said machine for moving said carriage from its non-casting to its casting position; a gear adapted to intermesh with a gear on said machine; a cam member; connections between said first gear and cam member; and a lever in the path of said cam member for moving said carriage from its casting to its non-casting position, substantially as described.

5. In a single type casting attachment for a linotype machine the combination of a movable mold carriage provided with a mold cavity; a pivoted lever adapted to be operated from the casting pot of said machine for moving said carriage from its non-casting to its casting position; a gear adapted to intermesh with a gear on said machine; a cam member; connections between said first gear and cam member; a lever in the path of said cam member for moving said carriage from its casting to its non-casting position; and a sliding ejector operated by said cam for forcing the cast type from said mold cavity, substantially as described.

6. In a single type casting attachment for a linotype machine the combination of a movable mold carriage provided with a mold cavity; a pivoted lever adapted to be operated from the casting pot of said machine for moving said carriage from its non-casting to its casting position; a gear adapted to intermesh with a gear on said machine; a cam member; gear connections between said first gear and cam member; a lever in the path of said cam member for moving said carriage from its casting to its non-casting position; a sliding plate; operative connections between said cam member and said plate; an ejector adapted to enter said cavity; and detachable connections between said ejector and plate, substantially as described.

7. In a single type casting attachment for a linotype machine the combination of a movable mold carriage provided with an adjustable mold member having a mold surface; a pivoted lever adapted to be operated from the casting pot of said machine for moving said carriage from its non-casting to its casting position; a gear adapted to intermesh with a gear on said machine; a cam member; connections between said first gear and cam member; a lever in the path of said cam member for moving said carriage from its casting to its non-casting position; an ejector having a mold surface; and connections between said cam member and said ejector for moving said last mentioned surface into casting position, substantially as described.

8. In a single type casting attachment for a linotype machine the combination of a reciprocating mold carriage; means for reciprocating the said carriage from said machine; a readily attachable and detachable ejector provided with a mold surface; an adjustable mold member reciprocating with said carriage provided with a second mold surface at right angles to said first mentioned surface; and means to limit the movements of said first mentioned surface, substantially as described.

9. In a single type casting attachment for a linotype machine the combination of a reciprocating mold carriage; means for reciprocating the said carriage from said machine; a readily attachable and detachable ejector provided with a mold surface; sliding means for reciprocating said ejector; slidable connections between said sliding means and said ejector enabling the latter to reciprocate with said carriage; an adjustable mold member reciprocating with said carriage provided with a second mold surface at right angles to said first mentioned surface; and means to limit the movements of said first mentioned surface, substantially as described.

10. In a single type casting attachment for a linotype machine the combination of a reciprocating mold carriage; means for reciprocating the said carriage from said machine; a readily attachable and detachable ejector provided with a mold surface; an adjustable mold member reciprocating with said carriage provided with a second mold surface at right angles to said first mentioned surface; and means to limit the movements of said first mentioned surface comprising an inclined surface and cam like means to adjust the latter, substantially as described.

11. In a single type casting attachment for a linotype machine the combination of a mold carriage provided with a mold cavity; means to admit metal from the casting pot of said machine into said cavity simultaneously with the casting of a line of type on said machine; and means to vary the size of said cavity comprising two adjustable mold members provided with mold surfaces extending in planes at right angles to each other, substantially as described.

12. In a single type casting attachment for a linotype machine the combination of a mold carriage provided with a mold cavity; means to admit metal from the casting pot of said machine into said cavity simultaneously with the casting of a line of type on said machine; means to vary the size of said cavity comprising two adjustable mold members provided with mold surfaces extending in planes at right angles to each other; and cam like means for governing the adjustment of one of said members, substantially as described.

13. In a single type casting attachment for a linotype machine the combination of a mold carriage provided with a mold cavity; means adapted to be operated by said machine for moving said carriage into its molding position; additional means adapted to be operated by said machine for moving said carriage out of its molding position; means to admit metal from the casting pot of said machine into said cavity simultaneously with the casting of a line of type on said machine; and means to vary the size of said cavity comprising two adjustable mold members provided with mold surfaces extending in planes at right angles to each other, substantially as described.

14. In a single type casting attachment for a linotype machine the combination of a mold carriage provided with a mold cavity; means adapted to be operated by said machine for moving said carriage into its molding position; additional means adapted to be operated by said machine for moving said carriage out of its molding position; means to admit metal from the casting pot of said machine into said cavity simultaneously with the casting of a line of type on said machine; means to vary the size of said cavity comprising two adjustable mold members provided with mold surfaces extending in planes at right angles to each other; means to reciprocate one of said mold members; and a readily detachable connection between said reciprocating means and said last named member, substantially as described.

15. In a single type casting attachment for a linotype machine the combination of a carriage provided with a mold cavity; means adapting said cavity to receive metal from the casting pot of said machine simultaneously with the casting of a line of type; a matrix box provided with a matrix fitting said cavity; and means for automatically disengaging said matrix from the cast type, substantially as described.

16. In a single type casting attachment for a linotype machine the combination of a carriage provided with a mold cavity; means adapting said cavity to receive metal from the casting pot of said machine simultaneously with the casting of a line of type; a matrix box provided with a matrix fitting said cavity; means for firmly holding said matrix in its casting position while metal is entering said cavity; and means for automatically disengaging said matrix from the cast type, substantially as described.

17. In a single type casting attachment for a linotype machine the combination of a carriage provided with a mold cavity; means adapting said cavity to receive metal from the casting pot of said machine simultaneously with the casting of a line of type; means for varying the dimensions of said cavity; a matrix box provided with a matrix fitting said cavity; wedge like means for firmly holding said matrix in its casting position; and means for automatically disengaging said matrix from the cast type, substantially as described.

18. In a single type casting attachment for a linotype machine the combination of a carriage provided with a mold cavity; means adapting said cavity to receive metal from the casting pot of said machine simultaneously with the casting of a line of type; a matrix box provided with a matrix fitting said cavity; means for preventing said matrix box being brought to its casting position when no matrix is in place; and means for automatically disengaging said matrix from the cast type, substantially as described.

19. In a single type casting attachment for a linotype machine the combination of a mold carriage provided with a mold cavity; means for moving said cavity into its casting position for receiving metal from the casting pot of said machine simultaneously with the casting of a line of type; a matrix box having a matrix fitting said cavity; and means causing said carriage and cavity not to be so moved unless the matrix box is in its normal position on said carriage, substantially as described.

20. In a single type casting attachment for a linotype machine the combination of a mold carriage provided with a mold cavity; means for moving said cavity into its casting position for receiving metal from the casting pot of said machine simultaneously with the casting of a line of type; a matrix box having a matrix fitting said cavity; and means comprising a lever adapted to be actuated by said pot for causing said carriage and cavity not to be so moved unless the matrix box is in its normal position on said carriage, substantially as described.

21. In a single type casting attachment for a linotype machine the combination of a mold carriage provided with a mold cavity; means for moving said cavity into its casting position for receiving metal from the casting pot of said machine simultaneously with the casting of a line of type; a matrix box having a matrix fitting said cavity; means comprising a lever adapted to be actuated by said pot for causing said carriage and cavity not to be so moved unless the matrix box is in its normal position on said carriage; and means for also automatically closing the entrance to said cavity when said lever is actuated, substantially as described.

22. In a single type casting attachment for a linotype machine the combination of a mold carriage provided with a cavity; a matrix box provided with a matrix adapted to coact with said cavity; means for automatically moving said carriage into its casting position; and means preventing said carriage from being so moved when said matrix box and matrix are not coacting with said cavity, substantially as described.

23. In a single type casting attachment for a linotype machine the combination of a mold carriage provided with a cavity; a matrix box provided with a matrix adapted to coact with said cavity; means for automatically moving said carriage into its casting position; means preventing said carriage from being so moved when said matrix box and matrix are not coacting with said cavity; and means preventing said box from being brought to its normal position on said carriage when it is not provided with a matrix, substantially as described.

24. In a single type casting attachment for a linotype machine the combination of a mold carriage provided with a cavity; a matrix box provided with a matrix adapted to coact with said cavity; means for automatically moving said carriage into its casting position; means preventing said carriage from being so moved when said matrix box and matrix are not coacting with said cavity; and means for automatically covering the entrance to said cavity when said carriage is not so moved, substantially as described.

25. In a single type casting attachment for a linotype machine the combination of a mold; a matrix coacting with said mold; automatic means for normally forcing metal into said mold from the melting pot of said machine simultaneously with the casting of a line of type; and means for preventing said metal from entering said mold when the latter is not in its normal casting position, substantially as described.

26. In a single type casting attachment for a linotype machine the combination of a mold; a matrix coacting with said mold; automatic means for normally forcing metal into said mold from the melting pot of said machine simultaneously with the casting of a line of type; and means comprising a lever and connections with said pot for preventing said metal from entering said mold when the latter is not in its casting position, substantially as described.

27. In a single type casting attachment for a linotype machine the combination of a mold; means to automatically cast single type in said mold simultaneously with the casting of lines of type on said machine; means to eject said single type from said mold between the intervals of casting said lines of type; and means to prevent said single type from reëntering the mold cavity after they have been ejected, substantially as described.

28. In a single type casting attachment for a linotype machine the combination of a mold; means to automatically cast single type in said mold simultaneously with the casting of lines of type on said machine; means to eject said single type from said mold between the intervals of casting said lines of type; and means comprising a channel way having an obstruction to prevent said single type from reëntering the mold cavity after they have been ejected, substantially as described.

29. In a single type casting attachment for a linotype machine the combination of a mold; means to automatically cast single type in said mold simultaneously with the casting of lines of type on said machine; means to eject said single type from said mold between the intervals of casting said lines of type; and means comprising a channel way having an obstruction and a movable member associated with said channel way to prevent said single type from reëntering the mold cavity after they have been ejected, substantially as described.

30. In a single type casting attachment for a linotype machine the combination of a mold; means to automatically cast single type in said mold simultaneously with the casting of lines of type on said machine; means to eject said single type from said mold between the intervals of casting said lines of type; means to prevent said single type from reëntering the mold cavity after they have been ejected; said means comprising a channel way provided with an obstruction behind which said type may move; means comprising a movable plate for forcing said type behind said obstruction; and reciprocated means for actuating said plate, substantially as described.

31. In a single type casting attachment for a linotype machine the combination of a mold; means to automatically cast a single type in said mold for each line of type cast by the machine; automatic ejecting means for forcing said single type out of said mold between the intervals of casting said lines of type; and means for separating the said type from any lugs cast thereon before the ejecting operation, substantially as described.

32. In a single type casting attachment for a linotype machine the combination of a mold; means to automatically cast a single type in said mold for each line of type cast by the machine; automatic ejecting means for forcing said single type out of said mold between the intervals of casting said lines of type; means for separating the said type from any lugs cast thereon before the ejecting operation; and additional means for automatically smoothly trimming said type after the separation of said lugs, substantially as described.

33. In a single type casting attachment for a linotype machine the combination of a mold; means to automatically cast a single type in said mold for each line of type cast by the machine; automatic ejecting means for forcing said single type out of said mold between the intervals of casting said lines of type; means for separating the said type from any lugs cast thereon before the ejecting operation comprising means for firmly holding said type and means for forcibly removing said lugs; and additional means comprising a fixed knife for smoothly trimming said type after the separation of said lugs, substantially as described.

34. In a single type casting attachment for a linotype machine the combination of a mold; means for automatically casting single type in said mold simultaneously with the casting of lines of type on said machine; and means for automatically scraping off, between the intervals of casting said lines of type, any metal that may adhere to the underside of said mold; substantially as described.

35. In a single type casting attachment for a linotype machine the combination of a mold; means for automatically casting single type in said mold simultaneously with the casting of lines of type on said machine; and means comprising a lever and a reciprocating trimming member for automatically scraping off, between the intervals of casting said lines of type, any metal that may adhere to the underside of said mold, substantially as described.

36. In a single type casting attachment for a linotype machine the combination of a movable mold; means to move said mold comprising a latch lever mounted on the casting pot of said machine and having a lug and a beveled toe; and a lever coacting with said lug and mold adapted to be moved by said lug when the pot moves in one direction, and to be passed over by said toe when said pot moves in an opposite direction, substantially as described.

37. In a single type casting attachment for a linotype machine the combination of a movable mold carriage having slide members; means to reciprocate said carriage; means adapted to be mounted on the casting pot of said machine to actuate said first named means and means to prevent said carriage from tilting during said reciprocations comprising a slide having overhanging members under which fit said slide members, substantially as described.

38. In a single type casting attachment for a linotype machine the combination of a mold carriage having a mold cavity; a matrix box adapted to rest on said carriage, having a stationary means for holding a matrix adapted to close said cavity; a slide carried by said box for also holding said matrix; and means carried by said slide for supporting said box on said carriage, substantially as described.

39. In a single type casting attachment for a linotype machine the combination of a mold carriage having a mold cavity; a matrix box adapted to rest on said carriage, having a stationary means for holding a matrix adapted to close said cavity; a slide carried by said box for also holding said matrix; means carried by said slide for supporting said box on said carriage; and additional means associated with said carriage and slide carried means for preventing said box assuming its normal position on said carriage when said matrix is not in place, substantially as described.

40. In a single type casting attachment for a linotype machine the combination of a mold carriage; a matrix box provided with a matrix normally resting on said carriage; and means preventing said box assuming its normal position when said matrix is not in place, substantially as described.

41. In a single type casting attachment for a linotype machine the combination of a mold carriage; a matrix box provided with a matrix normally resting on said carriage; and means on said carriage comprising a pair of lugs combined with a spring controlled member associated with said box for preventing said box assuming its normal position when said matrix is not in place, substantially as described.

42. In a single type casting attachment for a linotype machine the combination of a mold carriage adapted to slide on the frame of said attachment; a matrix box carrying a matrix pivotally mounted on and adapted to move with said carriage; and means attached to said frame against which said box is adapted to strike, substantially as described.

43. In a single type casting attachment for a linotype machine the combination of a mold carriage adapted to slide on the frame of said attachment; a matrix box carrying a matrix pivotally mounted on and adapted to move with said carriage; a spring controlled slidable member carrying the pivot for said box and a portion of the means for holding said matrix; and means attached to said frame against which said box is adapted to strike, substantially as described.

44. In a single type casting attachment for a linotype machine the combination of a mold carriage having a mold cavity; an adjustable member carrying one of the mold faces mounted on said carriage; a slidable ejector carrying another mold face movable in planes at right angles to said first face;

an adjustable stop for limiting the movements of said ejector; and pivoted cam means for controlling the position of said stop, substantially as described.

45. In a single type casting attachment for a linotype machine the combination of a mold carriage having a mold cavity; an adjustable member carrying one of the mold faces mounted on said carriage; a slidable ejector carrying another mold face movable in planes at right angles to said first face whereby the dimensions of said cavity and of the cast type may be varied; an adjustable stop for limiting the movements of said ejector; pivoted cam means for controlling the position of said stop; a channel way for receiving the type forced from said cavity; and means for changing the dimensions of said channel way to correspond with the dimensions of said cavity, substantially as described.

46. In a single type casting attachment for a linotype machine the combination of a pivoted latch lever provided with a trigger member mounted on the pot of said machine; a slotted lever coacting with said member; a sliding member provided with a pin working in the slot of said lever; and a safety lever controlled by the movements of said sliding member, substantially as described.

47. In a single type casting attachment for a linotype machine the combination of a pivoted latch lever provided with a trigger member mounted on the pot of said machine; a slotted lever coacting with said member; a sliding member provided with a pin working in the slot of said lever; a safety lever controlled by the movements of said sliding member; a mold; and a member also controlled by said sliding member for closing the entrance to said mold, substantially as described.

48. In a single type casting attachment for a linotype machine the combination of a pivoted hammer lever; a mold comprising an ejector, connections coöperating with said mold; and means to operate said hammer lever to free said ejector and connections should they become stuck, substantially as described.

49. In a single type casting attachment for a linotype machine the combination of a pivoted hammer lever; a mold comprising an ejector, connections coöperating with said mold; and means comprising a cam like projection and operative connections for said projection to operate said hammer lever to free said ejector and connections should they become stuck, substantially as described.

In testimony whereof, I affix my signature, in presence of two witnesses.

JOHN E. HANRAHAN.

Witnesses:
J. Le Roy Hopkins,
J. Q. H. Smith.

Copies of this patent may be obtained for five cents each, by addressing the "Commissioner of Patents, Washington, D. C."